United States Patent [19]

Maucher et al.

[11] Patent Number: 4,660,700
[45] Date of Patent: Apr. 28, 1987

[54] FRICTION CLUTCH AND METHOD OF ASSEMBLING THE SAME

[75] Inventors: Paul Maucher, Sasbach; Lothar Huber, Bühl/Baden, both of Fed. Rep. of Germany

[73] Assignee: Luk Lamellen und Kupplungsbau GmbH, Bühl, Fed. Rep. of Germany

[21] Appl. No.: 343,209

[22] Filed: Jan. 27, 1982

Related U.S. Application Data

[63] Continuation of Ser. No. 81,924, Oct. 4, 1979, abandoned.

[30] Foreign Application Priority Data

Oct. 4, 1978 [DE] Fed. Rep. of Germany ..... 28432895

[51] Int. Cl.$^4$ ............................................. F16D 13/50
[52] U.S. Cl. ............................... 192/89 B; 192/70.13; 192/70.27; 192/115
[58] Field of Search ................ 192/106.2, 106.1, 89 B, 192/109 A, 109 R, 70.13, 70.27, 70.28, 115; 29/513, 446

[56] References Cited

U.S. PATENT DOCUMENTS

| | | | |
|---|---|---|---|
| 2,453,504 | 11/1948 | Fleischer | 29/513 |
| 2,568,139 | 9/1951 | Behnke | 29/513 |
| 2,932,888 | 4/1960 | Ellis | 29/513 |
| 4,039,059 | 8/1977 | de Gennes | 192/89 B |
| 4,084,674 | 4/1978 | de Gennes | 192/89 B |
| 4,254,853 | 3/1981 | Huber | 192/89 B |

*Primary Examiner*—George H. Krizmanich
*Attorney, Agent, or Firm*—Peter K. Kontler

[57] ABSTRACT

A friction clutch having a cover, a diaphragm spring and a device for tiltably supporting the spring at the cover. The supporting device has a first support at the cover side, a circular second support at the other side of the spring, and holding sections stamped out of the material of the cover and bent so as to project through cutouts of the spring. The sections originally extend in the chordal or circumferential direction of the cover and are thereupon bent into planes extending at least substantially radially and at right angles to the plane of rotation of the cover. The entire sections or portions of the sections are bent in such a way that they extend axially beyond the second support and engage that side of the second support which faces away from the cover.

22 Claims, 5 Drawing Figures

FRICTION CLUTCH AND METHOD OF ASSEMBLING THE SAME

This application is a continuation of application Ser. No. 081,924, filed Oct. 4, 1979 now abandoned.

BACKGROUND OF THE INVENTION

The invention relates to friction clutches in which the diaphragm spring or cup spring is tiltable relative to the clutch cover between a first support on the cover side and a circular second support which is provided at the side of the diaphragm spring facing away from the cover, and wherein the second support is maintained in requisite position by holding means which are stamped and bent out of the material of the cover and project through cutouts in the diaphragm spring. In such clutches, the holding means are formed by a punched cutout made at least substantially in the direction of a chord or the circumference, and by bending the material of the cover next to the cutout in a plane which extends at least substantially in the radial direction and at right angles to the plane of rotation.

OBJECTS AND SUMMARY OF THE INVENTION

It is an object of the present invention to ensure the manufacture of such friction clutches in a particularly simple and cost-effective manner so as to make the clutches less expensive and to ensure, furthermore, perfect operation.

According to the present invention, this is achieved in that the holding means have sections which are bent for the purpose of holding the second support and engage behind the latter axially at the side facing away from the cover. This can be accomplished, for instance, by bending or tilting the sections of the holding means in the radial direction.

It may be particularly simple to bend or tilt at least the major part of each section after the second support is inserted and is stressed in the axial direction toward the diaphragm spring, i.e., especially if a cup spring or a cup spring-like part is used as a second support and is stressed before the sections of the holding means are bent or deflected in the radial direction over portions of the second support.

To this end, it is particularly advantageous if those portions of the sections which extend over the second support in the radial direction are formed simultaneously with stamping of the sections of holding means from the cover. This can be accomplished in a particularly simple manner by a cut in the holding means which extends radially and receives a portion of the second support after bending.

However, the holding contour of the sections of the holding means can be generated also if portions of the sections extending in the axial direction beyond the second support are bent over after the second support is put in place and the second support is surrounded in the radial direction by such bent-over portions which thus constitute holding portions for the second support.

The radial bending or laying-down or tilting can take place inwardly, depending on the requirements and on the design of the second support; however, for space and strength reasons as well as due to the design of customary friction clutches, it will be advantageous in most cases to bend the entire sections or portions of the sections radially outwardly.

If may further be advantageous if the holding portions of the sections which extend in the axial direction behind the contours of the major part of the holding means are turned or twisted behind the second support.

A further possibility consists in laying down or bending those holding portions of the sections which extend axially under the contours of the holding means behind the holding means at least approximately in the circumferential direction.

It is advantageous if, for forming the bent holding portions, there is provided a predetermined bending point which can be formed by reducing the cross section of the material such as by embossing or punching.

The shape of the already formed holding portions or of the holding portions yet to be formed after bending, as well as the shape of the wing- or tab-like sections can be cut circumferentially at least in part before these wing- or tab-like sections are laid down.

It may further be advantageous if the bending point for bending over the sections of the bending means, which extends at least substantially radially of the cover, is a predetermined bending point which can be formed by weakening the cross section of the material, such as by embossing, by appropriate punching or the like. It is particularly advantageous if the cross section is designed so that the predetermined bending point for bending of the sections of holding means is also the predetermined bending point for bending of the sections of the holding means in the radial driection, especially in the embodiment in which the sections of the holding means are swung radially as a whole. It may further be of advantage if the second support has cutouts through which the sections of the holding means project and if the holding portions of the sections overlie the contours adjacent to the cutouts.

The invention will now be explained in greater detail with reference to the embodiments which are shown in the drawing.

DESCRIPTION OF THE PREFERRED EMBODIMENTS

Figure 1:
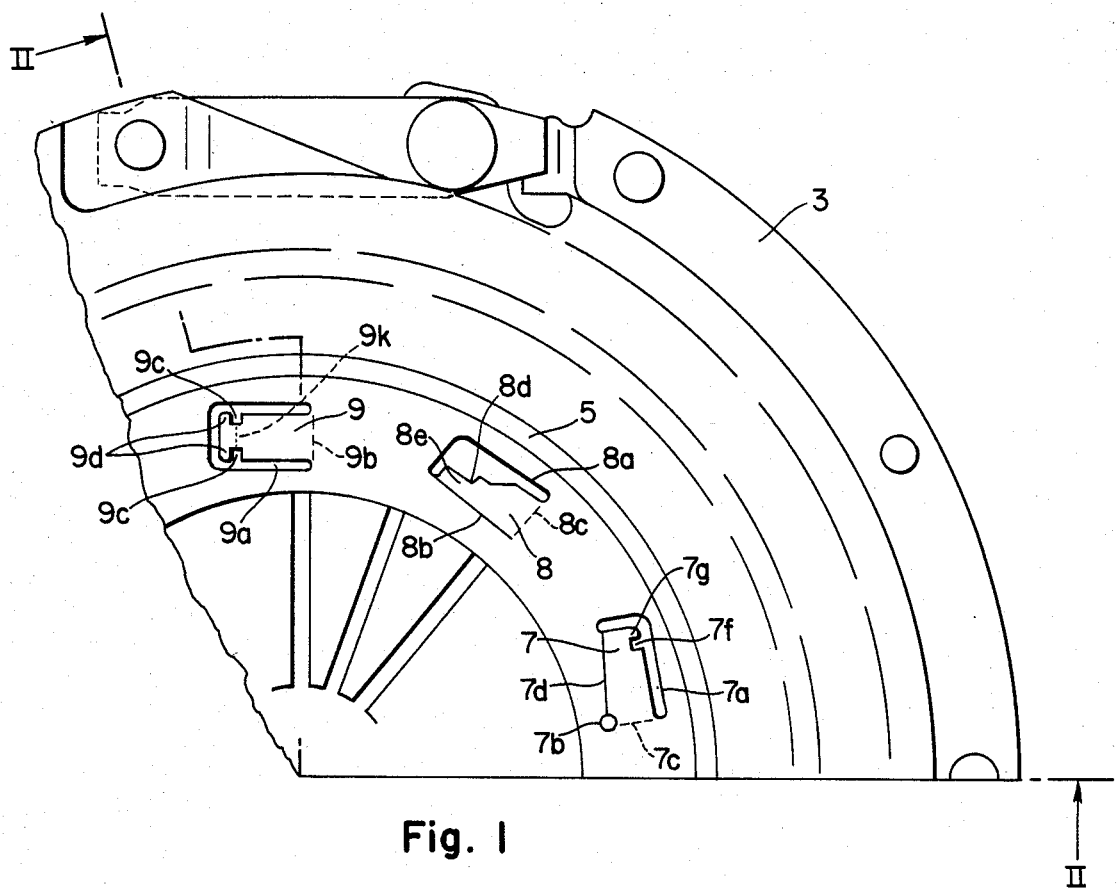
FIG. 1 is a fragmentary elevational view of the friction clutch.

As known per se, the friction clutch comprises a pressure plate 1 which is non-rotatably connected to a cover 3 by leaf springs 2 distributed over its circumference. A main cup spring or diaphragm spring 4 bears with its radially outer portion against the pressure plate 1 in a direction toward a firction disc, not shown, and is, radially further inward, tiltably supported between a first support 5 on the cover side and a circular second support in the form of a cup spring 6 provided on the side facing away from the cover. This second support is stressed in the axial direction and forms a self-adjusting abutment which compensates for wear.

The second support 6 is held by bent-over holding means which are punched out of the cover material and project through cutouts in the main cup spring 4. These holding means are formed from the cover by stamping involving the making of cuts extending at least substantially in the direction of a chord or the circumference and by bending the punched sections into an at least approximately radial plane which is perpendicular to the plane of rotation.

Figure 2:
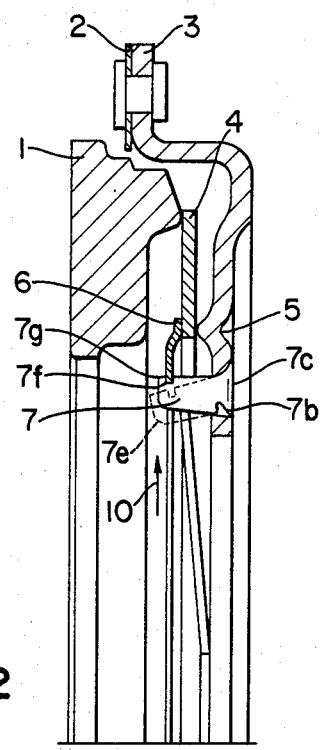
FIGS. 2, 3 and 4 are sectional views as seen in the direction of arrows from the line II—II of FIG. 1 but each showing a different embodiment of the invention.
Figure 3:
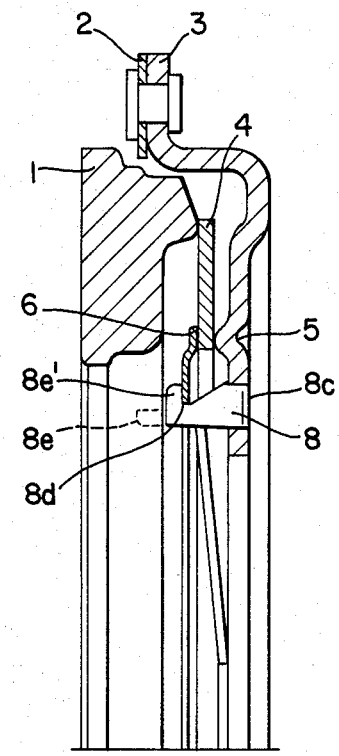

Different embodiments of the holding means are designated in FIG. 1 at 7, 8 and 9 and are shown in FIGS. 2, 3 as well as 4 and 5.

The holding means shown in FIGS. 1 and 2 and designed by the character 7 are formed in stages by first making a partial cut 7a. Further, a punched portion 7b is provided in order to obtain a reduced cross section at 7c, which at the same time constitutes the predetermined bending point for subsequent bending. Simutaneously with the making of a cut along the line 7d, the wing-like section of the holding means 7 can be bent along the line 7c into a plane which extends at least substantially in the radial direction. Optionally, a notch can be provided at 7c to facilitate the bending. The bent-over position is shown in FIG. 2 at 7e.

The section or wing of the holding means 7 also has a cut or notch 7f, which can be made simultaneously with the circumferential cut 7a.

For holding the second support 6, the latter is first tensioned by bending in it in its radially inner region in the axial direction toward the main cup spring 4 and, subsequently, the wing-like section of the holding means 7 is swing radially outwardly at least substantially as a whole along a line coinciding substantially with the line of the cut 7a in the direction of the arrow 10, so that the cut or notch 7f receives the inner edge of the second support 6 and the projection 7g constitutes a holding portion for the second support 6. This position of the wing-like section of the holding means 7 is indicated in FIG. 2 by solid lines. To particular advantage, the predetermined bending point 7c can serve for the bending of the section of the holding means 7 so that it points in the axial direction, as well as for the predetermined bending point to swing or tilt or bend the holding means radially outwardly in the direction of the arrow 10.

The holding means designated in FIG. 1 by the character 8 is first formed partially by a circumferential cut 8a. By a cut along the line 8b and by, optionally, simultaneous bending-over about a predetermined bending point 8c which may be formed, for instance, by a notch, the plate-like section of the holding means 8 is moved to the position shown in FIG. 3. While the circumferential cut 8a is being made, a predetermined bending point 8d can also be formed, and the tip 8e points in the axial direction.

After the second support is put in place and is tensioned, the tip 8e is bent, by bending it about the predetermined bending point 8d, radially outwardly to the position 8e' shown by solid lines and thus forms the holding portion for the second support 6.

Figure 4:
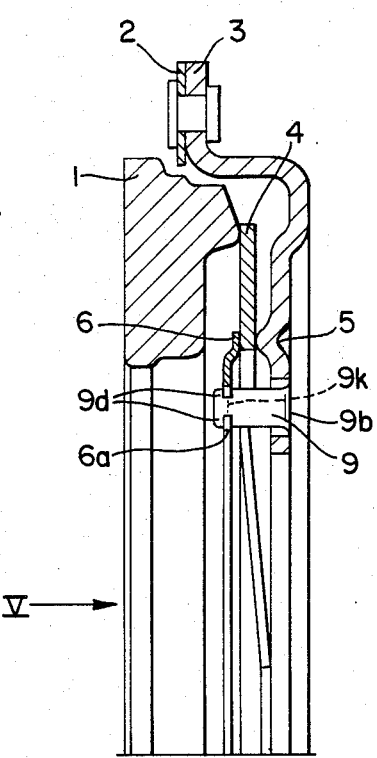

Another embodiment of the holding means is designated in FIG. 1 by the character 9 and will be explained in detail in conjunction with FIGS. 4 and 5. It will be assumed that the circumferential cut 9a is made in a first step and, subsequently, the wing-like section of 9 is bent the predetermined bending point 9b so that it points in the axial direction. The cuts 9c can be made simultaneously with the making of the circumferential cut 9a.

Figure 5:
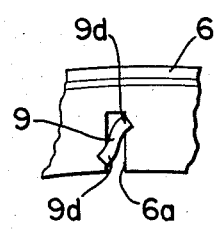
FIG. 5 is a view as seen in the direction of arrow V in FIG. 4.

After the second support 6 is put in place with its appropriately formed radial cutouts 6a and the second support is tensioned in the axial direction, the holding portions 9d, which are formed as a result of making the cuts 9c and extend beyond the second support 6 in the axial direction, are twisted (i.e., shifted substantially in the circumferential direction of the cover) so that they form the bracing for the second support 6, as per FIG. 5.

We claim:

1. A friction clutch, comprising a clutch cover; a diaphragm spring having cutouts and first and second sides respectively facing toward and away from said cover; and a device for tiltably coupling said spring to said cover, including a first support at said first side and a circular second support at said second side of said spring, and holding means consisting of the material of said cover and projecting through said cutouts, said holding means including chordally or circumferentially cut-out sections of said cover disposed in planes extending at least substantially radially of said cover and at right angles to the plane of rotation thereof as a result of bending of each section along a line which extends substantially radially of the spring, at least a portion of each of said sections being bent with reference to said cover along a second line which is inclined with reference to the respective first line so as to hold said second support and such portions of said sections extending axially beyond and engaging that side of said second support which faces away from said cover, the thickness of each of said holding means, as considered in the respective radially extending plane, exceeding its width, as considered in the circumferential direction of the spring.

2. The clutch of claim 1, wherein said portions of said sections are bent radially of said cover and hold said spring and said supports together.

3. The clutch of claim 1, wherein each of said sections is bent substantially as a whole so as to engage behind said second support at that side of said second support which faces away from said cover and to thus hold said spring and said supports together.

4. The clutch of claim 1, wherein said portions of said sections are adjacent to radially extending cuts provided in the respective sections.

5. The clutch of claim 1, wherein said portions of said sections are bent radially outwardly.

6. The clutch of claim 1, wherein said portions of said sections are twisted.

7. The clutch of claim 1, wherein said portions of said sections are shifted substantially in the circumferential direction of said cover relative to the rest of the respective sections.

8. The clutch of claim 1, wherein each of said sections has a given bending location formed by stamping from the material of said cover, such bending locations being adjacent to said second support and each thereof being disposed between said portion and the remainder of the respective section.

9. The clutch of claim 1, wherein each of said sections has a predetermined embossed bending location, such bending locations being adjacent to said second support and each thereof being disposed between said portion and the remainder of the respective section.

10. The clutch of claim 1, wherein each of said sections has a wing- or tab-like shape at least partially cut through the material of said cover.

11. The clutch of claim 1, wherein said portion of each of said sections is bent along a predetermined bending location extending substantially radially of said cover.

12. The clutch of claim 11, wherein said bending locations are formed by reducing the cross section of the material of said cover.

13. The clutch of claim 11, wherein said bending locations are formed with embossments for bending said portions of said sections therealong.

14. The clutch of claim 11, wherein each of said bending locations simultaneously serves for bending the respective section away from and in the radial direction of said cover.

15. The clutch of claim 1, wherein said second support has cutouts through which said sections extend.

16. A method of retaining a diaphragm spring which has substantially radially extending cutouts and is confined between the substantially circular cover and an annular support of a friction clutch, comprising the steps of making in the cover cuts extending at least substantially in the circumferential or chordal direction of the cover; bending sections of the matrrial of the cover adjacent to the cuts along first lines extending substantially radially of the spring and into planes extending substantially radially of the cover and at least substantially at right angles of the plane of rotation of the cover so that each section extends through a cutout of the spring and axially beyond that side of the support which faces away from the spring and that the thickness of each section, as considered in the respective radially extending plane, exceeds its width, as considered in the circumferential direction of the spring; and changing the position of at least a portion of each section with reference to the cover so that the portion bears against said side of the support, including bending said portion of each section along a second line which is inclined with reference to the respective first line.

17. The method of claim 16, wherein said position changing step includes bending at least the major part of each section.

18. The method of claim 16, wherein said position changing step includes bending said portion of each section substantially radially of the spring.

19. The method of claim 16, wherein said position changing step includes twisting each of said portions with reference to the remainder of the respective section.

20. The method of claim 16, further comprising the step of weakening the cover in those regions where the sections are bent into the respective planes.

21. The method of claim 16, further comprising the step of weakening the sections in those regions where said portions thereof change positions to engage the support.

22. The method of claim 16, further comprising the step of providing the support with slots for the passage of said portions of the sections.

* * * * *